United States Patent Office 2,937,981
Patented May 24, 1960

2,937,981

SUPPRESSION OF WATER DECOMPOSITION

Augustine O. Allen, Shoreham, N. Y., and Clarence J. Hochanadel, Oak Ridge, Tenn., assignors to the United States of America as represented by the United States Atomic Energy Commission No Drawing. Filed June 22, 1951, Ser. No. 233,118

1 Claim. (Cl. 204—154.2)

Our invention relates to a method of minimizing the decomposition of water resulting from ionizing radiations and more particularly to the suppression of water decomposition under nuclear reactor radiations.

Considerable interest has been evidenced in the design and construction of water cooled and water moderated nuclear reactors. During operation of these reactors, the cooling and moderating water is usually subjected to strong radiation by gamma rays and neutrons with the resulting decomposition of water into oxygen, hydrogen and hydrogen peroxide. Although the water decomposes to a slight extent only, even the small degree of decomposition thus far noted is of some concern to nuclear reactor designers, for, only a small amount of resulting gas bubbling may create a serious pile control problem. In addition it is also possible for an explosive mixture of hydrogen and oxygen to accumulate.

The mechanism by which the irradiated water decomposes is a complex process apparently involving a series of events whose existence can only be surmised. Most postulated mechanisms are based upon the formation of hydrogen (H) atoms and hydroxyl (OH) free radicals and subsequent reactions therebetween.

Numerous attempts have been made to solve the decomposition problem. One proposal involved contacting an accumulation of decomposition product gases with metallic recombination catalysts. However, additional equipment is required and such catalytic reagents are expensive. Furthermore, the introduction of alien material into the reactor system is required.

An object of our invention, therefore, is to provide a method for increasing the operating safety of a nuclear reactor which uses water as coolant or moderant.

Another object of our invention is to provide an improved method for suppressing the decomposition of water under ionizing radiations.

Still another object of our invention is to provide an improved method for suppressing the decomposition of water under nuclear reactor radiations.

Other objects and advantages of our invention will be apparent from the following description.

In accordance with our invention, we find that the decomposition of water under ionizing radiations, including nuclear reactor radiations, may be almost completely suppressed by dissolving a small amount of hydrogen gas therein.

Our method is extremely effective, simple and cheap. No additional apparatus is required other than a suitable valve, line, and hydrogen gas supply means. No element other than one already present is added to the water system.

Although our method is generally applicable to the suppression of water decomposition under ionizing radiations at any temperature, it is noted that high temperatures reduce, to a certain extent, such decomposition. It is expected, therefore, that our method would be of greater value when utilized with water being subjected to such radiations at relatively low temperatures.

The hydrogen gas may be added in any manner which ultimately effects its dissolution in the water. Thus, the hydrogen may be passed into a space above the surface of the water or directly into the water. However, the latter method appears more efficient and is therefore preferred.

We find, generally, that only a slight concentration of hydrogen gas in water suppresses radiation decomposition almost completely. Suitable quantities of hydrogen gas dissolved in water, for example, are from approximately 60 micromoles/liter to approximately saturation at atmospheric pressure (approximately 760 micromoles/liter at room temperature). However, it is preferred, as the simplest expedient, to merely saturate the water with hydrogen gas. This is particularly true when the water contains small amounts of reactive impurities, especially oxidizing agents such as oxygen gas which is absorbed from the atmosphere. Saturation with hydrogen gas thus assures sufficient reagent to overcome any possible harmful effect of these impurities. If, for some reason, it is desired to add much smaller amounts of hydrogen, we prefer to start with water that has been carefully purified and degassed.

The following Examples I, II, and III illustrate the amount of decomposition of water under pile irradiation with no addition, hydrogen peroxide addition and oxygen addition respectively, while Example IV illustrates our invention. In each of these examples, the four hour exposure period noted therein was sufficient for the concentration of the decomposition products to reach a steady state level.

Example I

A 10 cubic centimeter fused silica vessel was filled with triply distilled and degassed water and sealed. The vessel was then exposed to a mixture of gamma radiation and neutrons having all energies from thermal up to a few m.e.v. in a nuclear reactor for 4 hours at a measured fast neutron flux of approximately $0.5 \times 10^{12}$ neutrons per square centimeter per second. The exposure region was maintained at 25° C. After exposure the vessel was withdrawn from the hole and allowed to stand for a day in order to permit the resulting silicon activity to decay to a reasonable level. The water was then removed from the vessel and analyzed. Analysis indicated that approximately 25 micromoles per liter of hydrogen, approximately 11 micromoles per liter hydrogen peroxide and approximately 5 micromoles per liter oxygen had been formed.

Theoretically, the number of moles of hydrogen formed should be equal to the number of moles of hydrogen peroxide plus twice the number of moles oxygen. However, deviation from theory may be due to the vessel wall or slight impurities in the water entering into the reaction in some manner.

Example II

The procedure of Example I was followed except that approximately 300 micromoles per liter of carefully purified hydrogen peroxide were dissolved in the water. Analysis of the resulting solution indicated that approximately 400 micromoles per liter hydrogen and 100 micromoles per liter oxygen had been formed while the peroxide concentration had increased to approximately 500 micromoles per liter.

Example III

The procedure of Example I was followed except that approximately 1250 micromoles per liter of carefully purified oxygen were dissolved in the water.

Analysis of the resulting solution indicated that approximately 1500 micromoles per liter hydrogen peroxide and approximately 1000 micromoles per liter hydrogen had been formed while the oxygen concentration had decreased slightly to approximately 1150 micromoles per liter.

*Example IV*

The procedure of Example I was followed except that approximately 760 micromoles per liter of carefully purified hydrogen were dissolved in the water.

Analysis indicated that no detectable peroxide or oxygen had been formed in the irradiated water, while the hydrogen concentration had dropped slightly, probably due to absorption on the walls of the vessel.

Thus, the results of the above examples serve to illustrate the unusually favorable effect of our invention in suppressing the decomposition of water under ionizing radiation.

Furthermore, the above examples are merely illustrative and should not be construed as limiting the scope of our invention. Since hydrogen, deuterium and tritium are isotopic forms of the same element, they are chemical equivalents, and it is obvious that our invention is equally applicable to any isotopic mixture thereof, either in the water or in the gas added thereto. For example, our invention may be applied utilizing $D_2O$ liquid and $D_2$ gas, $D_2O$ liquid and natural hydrogen gas, or $H^3_2O$ liquid and $H^3_2$ (tritium) gas. In addition, an inert gas such as helium may be used to maintain very small concentrations of these hydrogen isotopes in water in a readily controllable manner. The scope of our invention, therefore, should be understood to be limited only as indicated by the appended claim.

What is claimed is:

A process of suppressing the formation of gaseous decomposition products in a sealed volume of substantially pure water exposed to a nuclear reactor neutron flux which comprises maintaining dissolved hydrogen in said volume from an external source at a concentration of approximately 60 micromoles to approximately 760 micromoles per liter of said water throughout the period of exposure of said water to said neutron flux.

References Cited in the file of this patent

UNITED STATES PATENTS 2,708,656     Fermi et al. _____ May 17, 1955

OTHER REFERENCES

Toulis: U.S. AEC Document UCRL–583, "The Decomposition of Water by Radiation," University of California Radiation Laboratory, Feb. 10, 1950, page 36 especially relied upon, publication consists of 42 pages.

ORNL–991, U.S. Atomic Energy Commission, May 8, 1951, page 13.

Outlines of Theoretical Chemistry, by Frederick H. Getman, 5th edition, 1927, John Wiley & Sons, New York, pages 268–271.

Chemical Effects of Ionizing Radiation on Simple Inorganic Compounds and Aqueous Solutions, by A. O. Allen, United States Atomic Energy Commission, MDDC–363, declassified Sept. 16, 1946, pages 1–9.

The Journal of Physical and Colloid Chemistry, vol. 52 (1948), pages 479–490. An article by Allen.